July 2, 1935.  J. G. JONES ET AL  2,006,459
ELECTRIC WELDING MACHINE FOR ALL METAL SPOOLS
Filed Aug. 1, 1933  2 Sheets-Sheet 1

Inventors:
John G. Jones &
Haywood G. Dewey,
By Newton M. Perrins
George A. Gillette, Jr.
Attorneys.

Inventors:
John G. Jones & Haywood G. Dewey,

Patented July 2, 1935

2,006,459

UNITED STATES PATENT OFFICE 2,006,459

ELECTRIC WELDING MACHINE FOR ALL-METAL SPOOLS

John G. Jones and Haywood G. Dewey, Rochester, N. Y., assignors to Eastman Kodak Company, Rochester, N. Y., a corporation of New York Application August 1, 1933, Serial No. 683,155

8 Claims. (Cl. 219—4)

The present invention relates to an electric welding machine and more particularly to the welding station for an automatic machine to be used in the manufacture of all-metal photographic spools.

The primary object of the present invention is the provision in an automatic electric welding machine of an actuating means for moving a pair of electrodes back and forth with respect to each other and which includes a connecting means having adjustable components so that the movement of the electrodes with respect to each other may be varied.

A further object of the present invention is the provision in an automatic electric welding machine of a pair of electrodes which may be reciprocated with respect to each other and of movable conductors forming electrical connections between electrodes and a source of electrical energy.

Still another object of the present invention is the provision in an automatic electric welding machine of a welding circuit which includes the secondary of a welding transformer, a pair of electrodes, the flanges and the spool core of a photographic receptacle in contacting position between the electrodes.

The foregoing and other objects of the invention are embodied in a welding station for an automatic electric welding machine which comprises a pair of electrodes slidably mounted within respective supports. A rocker means immediately supervises the reciprocation of the electrodes and a cam means imparts a predetermined motion to the electrodes through an intermediate connecting means which is adapted to be adjusted for variations of the reciprocating stroke of the electrodes. The secondary of the welding transformer is connected to the respective electrodes in series by means of a pair of movable conductors which form permanent and low resistance connections between the transformer and the electrodes.

Reference is hereby made to the accompanying drawings, in the several views of which, similar reference characters designate similar elements and in which:

Fig. 3 is a horizontal cross section through the holder for the spool core and is taken on the line 3—3 of Fig. 1.

Fig. 5 is a fragmentary cross section of an electrode to a larger scale.

Figure 1:
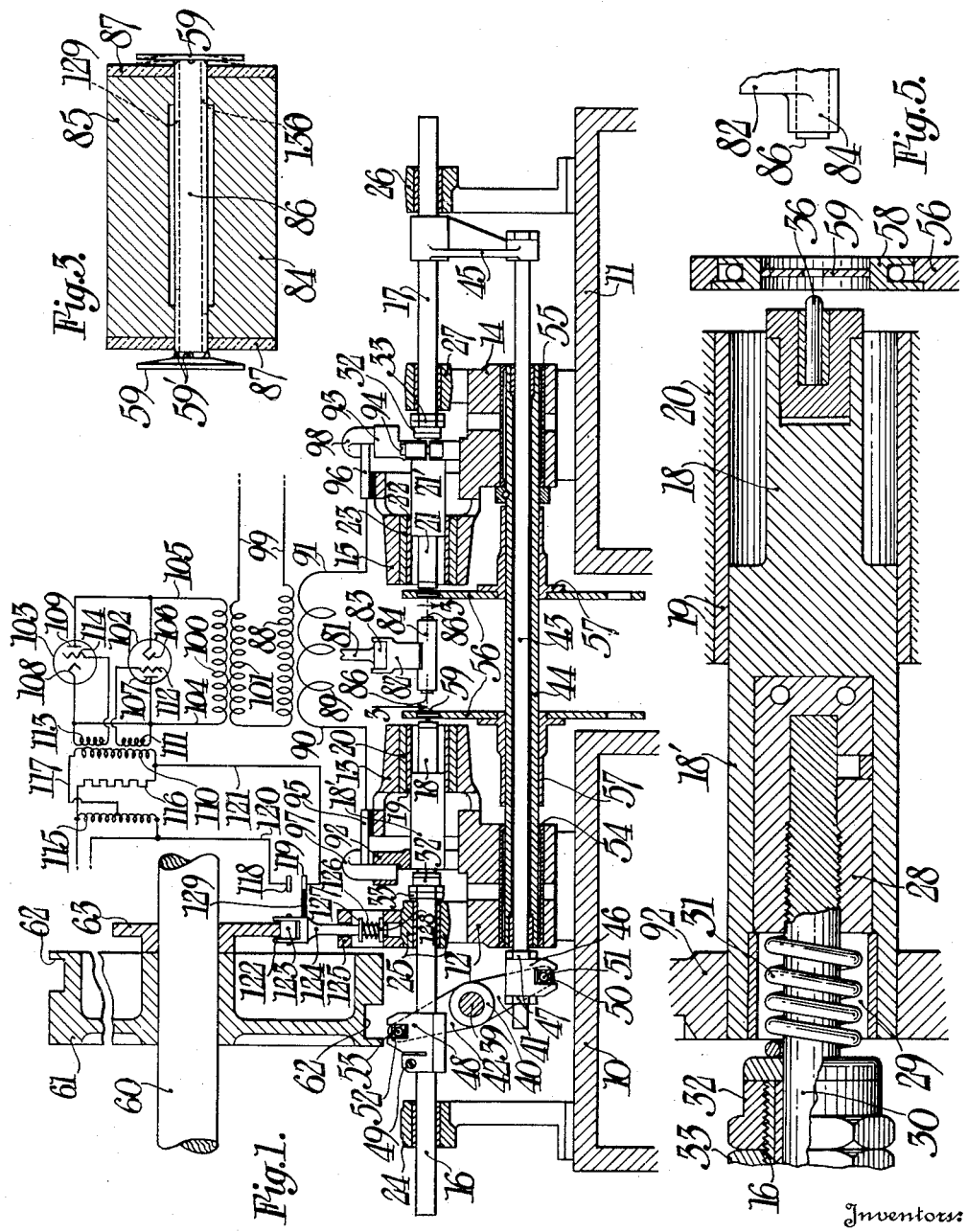
Fig. 1 is a vertical cross section through the welding station of an automatic electric welding machine.

In the illustrated embodiment of the invention, the welding station is mounted upon a pair of bed plates 10 and 11. A support 12 forms a sleeve 13 and is mounted upon bed plate 10 while a support 14 has a sleeve 15 and is mounted upon bed plate 11.

A pair of electrodes 16 and 17 are mounted to slide within the sleeves 13 and 15 of respective supports 12 and 14. Electrode 16 has a conducting terminal 18 having an enlarged portion 18' sliding within a bearing sleeve 19 surrounded by an insulating sleeve 20 which is mounted within sleeve 13, while electrode 17 has a conducting terminal 21 having an enlarged portion 21' sliding within a bearing sleeve 22 surrounded by an insulating sleeve 23 which is mounted within sleeve 15. A rear bearing 24 and an intermediate bearing 25 support the rear end and intermediate portions of electrode 16, respectively, while a rear bearing 26 and an intermediate bearing 27 support respective rear and intermediate portions of electrode 17.

The conducting terminals 18 and 21 are insulated from the remainder of electrodes 16 and 17, this construction being only illustrated with respect to electrode 17. An insulating plug 28, see Fig. 5, is set into conducting terminal 18 and is provided with a recess 29. A rod 30 extends from electrode 16 into an axial hole within plug 28.

The conducting terminal 18 is also resiliently separated from the remainder of the electrode 16 by a coil spring 31 which encircles rod 30 and extends into recess 29. A threaded sleeve 32 is screwed onto electrode 16 and is locked in desired position thereon by a lock nut 33. A similar threaded sleeve 32 and lock nut 33 are positioned on electrode 17.

A locating means such as a positioning pin 36 is mounted in the end of each conducting terminal 18 and 21.

An actuating means for moving the electrodes includes a rocker means for moving the electrodes in opposite directions, a cam means having a predetermined motion, and a connecting means for transmitting a proportional part of said predetermined motion from the cam means to the rocker means.

The rocker means preferably includes a rock shaft 39 which is rotatably mounted in the bed plate 10 and which supports a rocker member 40 having arms 41 and 42. A rod 43 is slidably supported by a sleeve 44, has one end attached to electrode 17 by a bracket 45, and is pivotally connected at the other end to the arm 41 of rocker member 40 by a jaw 46 which may be adjusted axially of rod 43 by a pair of nuts 47 threaded onto said rod 43. A jaw 48 is adjustably clamped to electrode 16 by a bolt 49. A block 50 slidably engages jaw 46 and is pivotally connected to arm 41 of rocker member 40 by a pin 51, while a block 52 slidably engages jaw 48 and is pivotally connected to arm 42 by a pin 53. Upon rotation of rock shaft 39, electrodes 16 and 17 are moved from the position shown in Fig. 1 toward each other and the relative positions of said electrodes 16 and 17 may be altered by adjustment of jaws 46 and 48 in axial direction along rod 43 or electrode 16, respectively.

The sleeve 44 is supported by a pair of bearing sleeves 54 and 55 which are mounted within respective supports 12 and 14. A circular plate 56 is attached to sleeve 57 which is slidably and rotatably supported upon the exterior of sleeve 44 and which is located adjacent sleeve portion 13 of support 12. A plurality of clutch members 58 are positioned in circumferentially spaced apertures in plate 56 and are adapted to support one of the members to be welded, such as a spool flange 59. The plate 56, sleeve 57 and clutch members 58 are duplicated to form a support for members to be welded adjacent to sleeve portion 15 and support 14.

The cam means of the actuating means preferably includes a cam shaft 60 which is rotatably mounted on the machine in any suitable manner, a cylindrical cam 61 fixed to cam shaft 60 and provided with a cam slot 62, and a plate cam 63, affixed to shaft 60 and performing a function later to be described.

Figure 2:
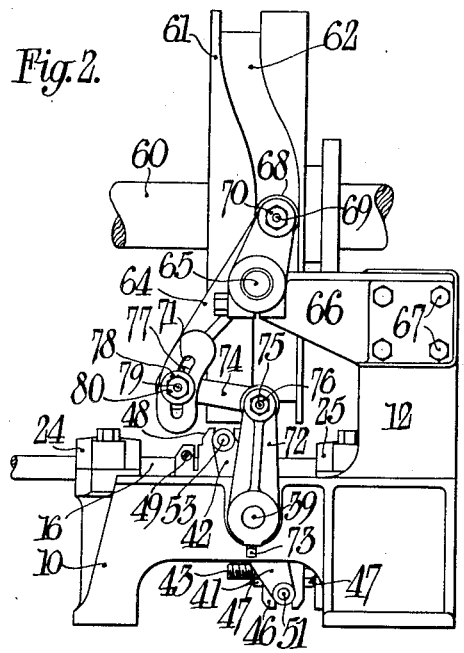
Fig. 2 is a fragmentary front elevation of the welding station showing particularly the connecting means for imparting movement to the electrodes.

The connecting means of the actuating means is shown in Fig. 2 of the drawings and includes a bell crank 64 intermediately pivoted upon a shaft 65 which is supported by a bracket 66 attached to support 12 by a plurality of bolts 67. A cam follower 68 is rotatably mounted upon a spindle 69 which is attached to one end of a bell crank 64 by a nut 70 while the other end of bell crank 64 is provided with an arcuate slot 71. The connecting means also includes a crank arm 72 affixed to rock shaft 39 by a set screw 73 and includes a link 74 which has one end pivotally connected to the crank arm 72 by a bolt 75 and nut 76 and which has the other end adjustably connected to said other end of bell crank 64 within arcuate slot 71 by means of washers 77 and 78, bolt 79 and nut 80. The arcuate slot 71 is curved about the axis of bolt 75 as a center and has a radius of curvature equal to the distance between the axes of bolts 75 and 79. The cam follower 68 is located within cam slot 62 and receives a definite predetermined motion corresponding to the amplitude and contour of said cam slot 62.

Upon the rotation of cam shaft 60, cam 61 is rotated and cam follower 68 is given a predetermined motion by the cam slot 62. This predetermined motion is the same for any one design of the cylindrical cam and is imparted to bell crank 64. However, the proportion of the said predetermined motion which is transmitted by link 74 and crank arm 72 to rock shaft 39 depends upon the location of bolt 79 within arcuate slot 71. Furthermore, link 74 may be adjusted to various angular positions about the axis of bolt 75 without causing any relative motion between the elements of the connecting means or the actuating means.

A holder 81 is mounted upon the machine in any suitable manner and is located in the position shown in Fig. 1. Holder 81 comprises a pair of arms 82 and 83 as well as pair of jaws 84 and 85 attached to the ends of respective arms 82 and 83. The jaws 84 and 85 of holder 81 are recessed to grip and support a spool core 86, see Fig. 3. The ends of jaws 84 and 85 are faced with insulating end strips 87 beyond which the ends of core 86 extend a small distance.

The spool flanges 59 are provided with projections 59' according to the disclosure of Patent #1,754,205 issued to John G. Jones on April 8, 1930 and are dished according to the disclosure in our co-pending application for improvements in a Method of welding spools, Serial No. 683,154 filed on even date herewith. The dishing of flanges 59 and the provision of projections 59' thereon prior to the welding operation is disclosed at one end of Fig. 3 while the position and condition of the flange after the welding operation is shown at the other end of Fig. 3.

When the machine is started, rock shaft 39 will be rotated in a clock-wise direction from the position shown in Fig. 1 by the action of said cam means and said connecting means. As a result rocker member 40 will also rotate in a clock-wise direction and the conducting terminals 18 and 21 of respective electrodes 16 and 17 will be moved toward each other. In their travel toward each other terminals 18 and 21 will move into abutting relation with respect to the spool flanges 59 held in the clutch members 58 of plates 56. The positioning pins 36 will enter the flanges 59. Further movement of terminals 18 and 21 releases flanges 59 from the clutch members 58 but the positioning pins 36 support said flanges 59 upon the ends of electrode terminals 18 and 21.

Continued movement of the rock shaft 39 by the cam and the connecting means moves the conducting terminals 18 and 21 of the electrodes into the positions indicated by dotted lines in Fig. 1 with the projections 59' of spool flanges 59 in abutment with the ends of the spool core 86 as shown at the left side of Fig. 3. Additional movement of the rock shaft 39, now moves electrodes 16 and 17 with respect to the conducting terminals 18 and 21 so that coil springs 31 are compressed and so that projections 59' are resiliently pressed against the ends of spool core 86 at a pressure corresponding to the tension of said springs 31.

The electrodes 16 and 17, regardless of the adjusted position of link 74, are always returned to the positions shown in Fig. 1. Raising or lowering of the adjustable end of link 74 within arcuate slot 71, merely decreases or increases, respectively, the distances traveled by the electrodes 16 and 17 from this inoperative position of rest. Therefore, if the projections 59' of flanges 59 are not being moved into abutment with the ends of core 86, nut 80 is loosened and bolt 79 is moved farther out in slot 71. The same adjustment would be made if an increase in the resilient pressure on projections 59' in abutting position is desired. However, if only one of the conducting terminals 18 or 21 is being moved too far, then the adjustment must be accomplished by changing the axial position of jaw 48 on electrode 16 or jaw 46 on rod 43.

A welding circuit is adapted to supply a suitable welding current to the electrodes and includes a welding transformer and a pair of movable conductors between the leads of the transformer secondary and the electrodes. The welding transformer has a primary 88 and a secondary 89 which has a pair of leads 90 and 91. A bushing 92 is clamped to the enlarged portion 18' on conducting terminal 18 of electrode 16 while a bushing 93 is clamped by a bolt 94 to the enlarged portion 21' on conducting terminal 21 of electrode 17. A stationary bushing 95 is attached to but insulated from the sleeve 13 of support 12 and a stationary bushing 96 is attached to but insulated from sleeve 15 of support 14. The transformer secondary leads 90 and 91 are connected to stationary bushings 95 and 96, respectively. A bowed conductor 97 has one end journaled in bushing 92 and the other end journaled in stationary bushing 95 while a bowed conductor 98 has one end journaled in bushing 93 and the other end journaled in stationary bushing 96.

The journal bearings in bushings 92 and 93 will have a definite travel upon movement of the conducting terminals 18 and 21 of electrodes 16 and 17 and the journal bearings in stationary bushings 95 and 96 are spaced laterally from and opposite an intermediate portion of the path of the journal bearings in bushings 92 and 93. As a result bowed conductors 97 and 98 will swing about stationary bushings 95 and 96 but the ends of said conductors 97 and 98 which are journaled in bushings 92 and 93 will move in a straight line with electrodes 16 and 17. However, the resiliency in bowed conductors 97 and 98 will compensate for curvature in the path through which the ends of conductors 97 and 98 would normally move and the distances between the journal bearings in bushings 92 and 95, 93 and 96, may be selected so that such curvature is not appreciable. This manner of mounting the movable conductors of the welding circuit prolongs the life of these conductors which must be large in cross-section to carry the excessive welding currents necessary for electric welding and particularly series welding.

The welding transformer is energized through supply mains 99 of a suitable source of electrical energy. The energization of the welding transformer must be timed with respect to the movement of electrodes 16 and 17 and should take place only after the conducting terminals 18 and 21 of said electrodes 16 and 17 have carried the projections 59' on spool flanges 59 into abutment with the ends of spool core 86 to complete the welding circuit through the transformer secondary 89, wires 90 and 91, bushings 95 and 96, bowed conductors 97 and 98, bushings 92 and 93, and conducting terminals 18 and 21. Such energization of the welding transformer is governed by a control circuit which includes a switch operated by the cam means in timed relation to the movement of electrodes 16 and 17.

The cross-section of the spool core 86 is materially reduced by the slots 129 and 130 which are generally provided in the cores of photographic spools. As a result the welding current may be so large as to cause excessive heating and distortion of the spool core 86 adjacent the slots 129 and 130. Consequently the jaws 84 and 85 of the holder may be composed of conducting material such as copper, so that additional conducting area is provided for the welding current which must otherwise pass through spool core 86.

The control circuit includes the secondary 100 of a transformer which has its primary 101 connected in series with one of the supply mains 99. A pair of grid controlled rectifiers 102 and 103 of the hot cathode gas filled type are connected in inverse relation across the leads 104 and 105 of the series transformer secondary 100. The rectifier 102 has a cathode 106 connected to lead 105 and an anode 107 connected to lead 104 while rectifier 103 has a cathode 108 connected to lead 104 and an anode 109 connected to lead 105. A grid transformer has a primary winding 110, a secondary winding 111 which is connected at one end to the grid 112 of rectifier 102 and at the other end to lead 104, and another secondary winding 113 which is connected across the grid 114 of rectifier 103 and lead 104, ends of opposite polarity of the windings 111 and 113 being connected to the respective grids 112 and 114. A filament transformer 115 has one side connected through a resistor 116 to one side of the primary 110 of the grid transformer and has an intermediate tap 117 connected to the other side of primary 110 of the grid transformer. The control circuit also includes a switch which may be composed of a pair of contacts 118 and 119. Contact 118 is connected by a wire 120 to one side of filament transformer 115 while contact 119 is connected by a wire 121 to one side of the primary 110 of the grid transformer. Electrical energy is supplied to the two sides of filament transformer 115 of a voltage preferably equal to that across the supply mains 99.

The switch of the control circuit is operated by the plate cam 63 of the cam means in timed relation to the movement of the electrodes 16 and 17. A yoke 122 rotatably supports a roller 123 and has a stem 124 which slides within a bracket 125 affixed to the machine. A coil spring 126 encircles stem 124 between a collar 127 fastened thereto and a washer 128 resting on bracket 125. A rod 129 is attached to yoke 122 and carries contact 119 of the switch for the control circuit. The coil spring 126 maintains roller 123 against the edge of plate cam 63 and contact 119 is raised to closed position and lowered to open position by the movements of yoke 122 which correspond to the outline of cam 63.

Upon rotation of plate cam 63, the yoke 122 is raised by spring 126 and contacts 118 and 119 make contact. The grid transformer is energized and an alternating potential is impressed upon the grids 112 and 114 of rectifiers 102 and 103. The potential on the grids of the gas filled rectifiers will draw an arc between the anode and cathode in one tube during the first half cycle of the alternating current supply and between the anode and cathode in the other tube during the next half cycle of the alternating current supply. In effect, the secondary 100 of the series transformer is short-circuited so that the impedance of the supply circuit is materially reduced and the current in the primary 88 of the welding transformer is increased. When the contacts 118 and 119 are separated again the alternating potential between the cathodes and anodes of rectifiers 102 and 103 will be reduced to zero during the next cycle so that the rectifiers will cease to arc, the impedance of the series transformer will increase and the current passing through primary 88 of the welding transformer will be reduced.

Figure 4:
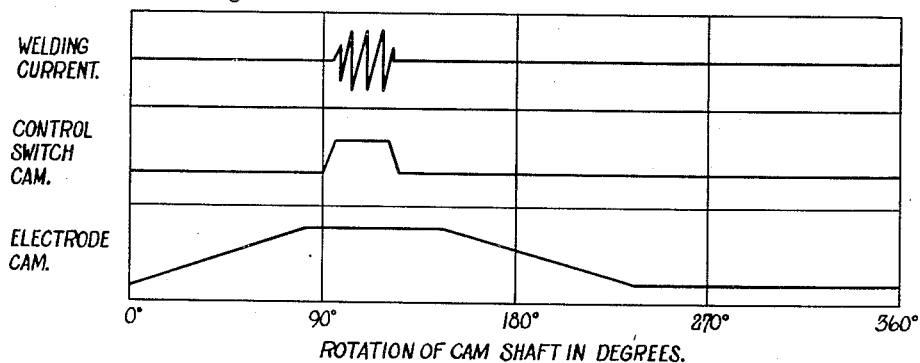
Fig. 4 is a time chart illustrating the relative timing of the cam for moving the electrodes and the cam for controlling energization of the welding circuit, an oscillagraph of the welding current also being indicated in timed relation.

The cylindrical cam 61 has a contour which is represented by the lowest time chart in Fig. 4 and the plate cam 63 has an outline represented by the middle time chart of Fig. 4. Cams 61 and 63 are both mounted upon a common cam shaft 60 and their relative timing is illustrated in these two charts of Fig. 4. The relation of cams 61 and 63 is such that after the conducting terminals 18 and 21 of electrodes 16 and 17 have carried the projectors 59' of flanges 59 into abutment with the ends of core 86, the contact points 118 and 119 are closed and the welding current flows as indicated in the topmost chart of Fig. 4.

The welding current melts the projectors 59' on the flanges 59 and the adjacent portions of the spool core 86 so that a plurality of welds are formed between the core 86 and the flanges 59. The resilient pressures on the conducting terminals 18 and 21 cause compression of the molten portions and move the flanges 59 into abutment with the ends of core 86. The cam 63 then separates contacts 118 and 119 so that the welding current is cut off. The flanges 59 now cool and assume a plane surface formation. The clearance between the flanges 59 and the insulating end strips 87 is very small, being about 0.003 of an inch, so that the flanges cannot buckle in the opposite direction, but if exhibiting such a tendency will be flattened out against end strips 87, as indicated by dotted lines at the right side of Fig. 3.

The conducting terminals 18 and 21 of electrodes 16 and 17 remain in welding position, as represented by the higher horizontal line of the cylindrical cam chart, until the welds have cooled sufficiently, whereupon the electrodes are retracted leaving the finished spool between the jaws 84 and 85 of holder 81.

Since many modifications of the present invention may be made without departing from the spirit thereof, the present disclosure is to be construed in an illustrative and not in a limiting sense.

Having now particularly described our invention what we claim as new and what we desire to secure by Letters Patent of the United States is:

1. In a machine for welding spool flanges to a core, the combination with a holder adapted to support a core, a pair of supports, and a pair of electrodes each movable in its respective support and each adapted to carry a spool flange, of a single actuating means for said electrodes, including a rocker means connected to each of said electrodes and for moving the same in opposite directions, including a single cam means having a predetermined motion, and including a connecting means for transmitting a proportional part of said predetermined motion from said cam means to said rocker means.

2. In a machine for welding spool flanges to a core, the combination with a holder adapted to support a core, a pair of supports, and a pair of electrodes each movable in its respective support and each adapted to carry a spool flange, of a single actuating means for said electrodes, including a rocker means connected to each of said electrodes and for moving the same in opposite directions, including a single cam means having a predetermined motion, and including a connecting means having an adjustable link for varying the proportion of said predetermined motion transmitted from said cam means to said rocker means.

3. In a machine for welding spool flanges to a core, the combination with a holder adapted to support a core, a pair of supports, and a pair of electrodes each movable in its respective support and each adapted to carry a spool flange, of a single actuating means for said electrodes, including a rocker means connected to each of said electrodes and for moving the same in opposite directions, including a single cam means having a predetermined motion, and including a connecting means for transmitting a proportional part of said predetermined motion from said cam means to said rocker means, said connecting means having a movable link for transmitting motion and which is adjustable to various angular positions to vary the proportions of the transmitted motion.

4. In a machine for welding spool flanges to a core, the combination with a holder adapted to support a core, a pair of supports, and a pair of electrodes each movable in its respective support, and each adapted to carry a spool flange, of a single actuating means for said electrodes, including a rocker means having adjustable connections to each of said electrodes and for moving the same in opposite directions, including a single cam means having a predetermined motion, and including a connecting means for transmitting motion and a proportional part of said predetermined motion from said cam means to said rocker means.

5. In a machine for welding spool flanges to a core, the combination with a holder adapted to support a core, a pair of supports, and an electrode movable in each support and adapted to carry flanges into abutting position with respect to the ends of said core, of a rod attached to one electrode and movable in said support, a rocker member centrally pivoted and having two arms, a pivotal connection between said rod and one arm of said rocker member, and a second pivotal connection between said other electrode and the other arm of said rocker member, both pivotal connections being adjustable respectively along said rod and said other electrode.

6. In an electric welding machine, the combination with a pair of supports, a pair of electrodes each movably mounted in its respective support, a bushing attached to each electrode, and an actuating means for imparting to said electrodes a definite stroke in opposite directions, of a stationary bushing on each support in spaced relation to and opposite the center of the path travelled by the bushing on each electrode a welding transformer having a pair of secondary leads connected to respective stationary bushings, and a pair of arcuate conductors, each having one end journaled in the bushing on said support and the other end journaled in the bushing on said electrodes.

7. In a machine for electrically welding spool flanges to a core provided with a central longitudinal slot, the combination with a holder adapted to support the core and including a conductor which is adapted electrically to contact said core adjacent the ends thereof and electrically to bridge the slot in said core, and a pair of electrodes movably mounted and adapted in operative position to maintain the flanges against the ends of said core, of a series welding circuit including said electrodes, adapted to include said flanges in abutment with the ends of said core, and including said conductor connected in parallel across the slotted portion of said core.

8. In a machine for electrically welding spool flanges to a core provided with a central longitudinal slot, the combination with a holder adapted to support the core and including a conducting jaw which is adapted electrically to bridge the slot in said core, and a pair of electrodes movably mounted and adapted in operative position to maintain the flanges against the ends of said core in said holder, of a series welding circuit including said electrodes, adapted to include said flanges in abutment with the ends of said core, and including said conducting jaw in parallel across the slotted portion of said core.

JOHN G. JONES.
HAYWOOD G. DEWEY.